United States Patent
Koelman et al.

(10) Patent No.: US 9,234,999 B2
(45) Date of Patent: Jan. 12, 2016

(54) SYSTEM AND METHOD FOR MAKING DISTRIBUTED MEASUREMENTS USING FIBER OPTIC CABLE

(75) Inventors: Johannes Maria Vianney Antonius Koelman, Rijswijk (NL); Peter Berkeley Wills, Houston, TX (US); Menno Mathieu Molenaar, Calgary (CA); Barbara Ellen Cox, Calgary (CA); Daniel Joinson, Rijswijk (NL)

(73) Assignee: Shell Oil Company, Houston, TX (US)

( * ) Notice: Subject to any disclaimer, the term of this patent is extended or adjusted under 35 U.S.C. 154(b) by 320 days.

(21) Appl. No.: 13/996,452

(22) PCT Filed: Dec. 9, 2011

(86) PCT No.: PCT/US2011/064098
§ 371 (c)(1),
(2), (4) Date: Jun. 20, 2013

(87) PCT Pub. No.: WO2012/087603
PCT Pub. Date: Jun. 28, 2012

(65) Prior Publication Data
US 2013/0294720 A1    Nov. 7, 2013

Related U.S. Application Data

(60) Provisional application No. 61/425,543, filed on Dec. 21, 2010.

(51) Int. Cl.
*G02B 6/00* (2006.01)
*G01J 1/04* (2006.01)
(Continued)

(52) U.S. Cl.
CPC *G02B 6/10* (2013.01); *G01D 5/353* (2013.01); *G01H 9/004* (2013.01); *G02B 6/447* (2013.01)

(58) Field of Classification Search
CPC .......... G02B 6/10; G02B 6/447; G01D 5/353; G01H 9/004
USPC ...................... 385/12–13; 250/227.14, 227.18
See application file for complete search history.

(56) References Cited

U.S. PATENT DOCUMENTS

| 3,941,927 A | 3/1976 | Russell |
| 5,280,173 A | 1/1994 | Morse et al. ............. 250/227.23 |

(Continued)

FOREIGN PATENT DOCUMENTS

| GB | 2364380 | 1/2002 |
| JP | 6435284 | 2/1989 |

(Continued)

OTHER PUBLICATIONS

PCT International Search Report, Application No. PCT/US2011/064098 dated Mar. 28, 2012.

*Primary Examiner* — Akm Enayet Ullah
*Assistant Examiner* — Michael Mooney

(57) ABSTRACT

A method for determining the physical location of a fiber optic channel in a fiber optic cable comprises the steps of a) providing at least one location key having a known physical location, b) establishing the location of the location key with respect to the fiber optic channel, and c) using the location information established in step b) to determine the physical location of the channel. The location key may comprises an acoustic source, a section of fiber optic cable that is acoustically masked, or at least one magnetic field source and step b) comprises using a Lorentz force to establish the location of the magnetic field source with respect to the fiber optic channel.

8 Claims, 1 Drawing Sheet

(51) Int. Cl.
*G02B 6/10* (2006.01)
*G01D 5/353* (2006.01)
*G01H 9/00* (2006.01)
*G02B 6/44* (2006.01)

(56) References Cited

U.S. PATENT DOCUMENTS

| | | | |
|---|---|---|---|
| 6,148,123 A * | 11/2000 | Eslambolchi et al. | 385/13 |
| 6,268,911 B1 | 7/2001 | Tubel et al. | |
| 6,281,489 B1 | 8/2001 | Tubel et al. | |
| 6,588,266 B2 | 7/2003 | Tubel et al. | |
| 6,787,758 B2 | 9/2004 | Tubel et al. | |
| 6,913,079 B2 * | 7/2005 | Tubel | 166/250.01 |
| 7,040,390 B2 | 5/2006 | Tubel et al. | |
| 7,201,221 B2 | 4/2007 | Tubel et al. | |
| 7,284,903 B2 | 10/2007 | Hartog | |
| 7,593,115 B2 | 9/2009 | Hernandez-Solis et al. | 356/600 |
| 7,668,411 B2 | 2/2010 | Davies et al. | |
| 7,740,064 B2 | 6/2010 | McCoy et al. | |
| 7,946,341 B2 | 5/2011 | Hartog et al. | |
| 7,954,560 B2 | 6/2011 | Mathiszik et al. | |
| 2004/0043501 A1 | 3/2004 | Means et al. | |
| 2004/0163809 A1 | 8/2004 | Mayeu et al. | |
| 2009/0102474 A1 * | 4/2009 | Cranch et al. | 324/244.1 |
| 2009/0188665 A1 | 7/2009 | Tubel et al. | |
| 2010/0107754 A1 | 5/2010 | Hartog et al. | |
| 2010/0207019 A1 | 8/2010 | Hartog et al. | |
| 2010/0315630 A1 | 12/2010 | Ramos et al. | |
| 2011/0044574 A1 | 2/2011 | Strong | |
| 2011/0069302 A1 | 3/2011 | Hill et al. | |
| 2011/0088462 A1 | 4/2011 | Samson et al. | |
| 2011/0088910 A1 | 4/2011 | McCann et al. | |
| 2011/0149688 A1 | 6/2011 | Hill et al. | |
| 2011/0185815 A1 | 8/2011 | McCann | |
| 2011/0216996 A1 | 9/2011 | Rogers | |
| 2011/0280103 A1 | 11/2011 | Bostick, III | |
| 2011/0292763 A1 | 12/2011 | Coates et al. | |
| 2012/0017687 A1 | 1/2012 | Davis et al. | |
| 2012/0018149 A1 | 1/2012 | Fidan et al. | |

FOREIGN PATENT DOCUMENTS

| | | |
|---|---|---|
| WO | 2009158630 | 12/2009 |
| WO | 2010010318 | 1/2010 |
| WO | 2010034986 | 4/2010 |
| WO | 2010136764 | 12/2010 |
| WO | 2010136810 | 12/2010 |
| WO | 2011010110 | 1/2011 |
| WO | 2011039501 | 4/2011 |
| WO | 2011039501 A2 | 4/2011 |
| WO | 2011015313 | 5/2011 |
| WO | 2011058312 | 5/2011 |
| WO | 2011058313 | 5/2011 |
| WO | 2011058314 | 5/2011 |
| WO | 2011058322 | 5/2011 |
| WO | 2011067554 | 6/2011 |
| WO | 2011076850 | 6/2011 |
| WO | 2011079107 | 6/2011 |
| WO | 2011141537 | 11/2011 |
| WO | 2011148128 | 12/2011 |

\* cited by examiner

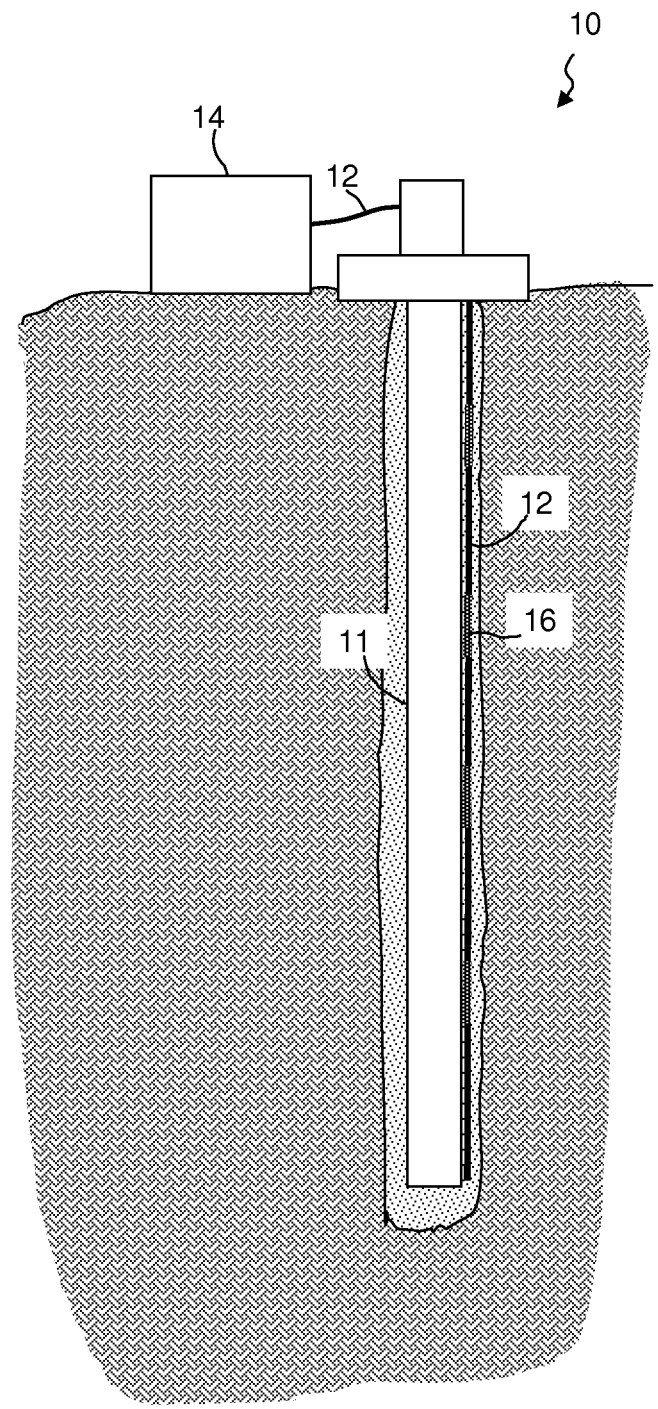

SYSTEM AND METHOD FOR MAKING DISTRIBUTED MEASUREMENTS USING FIBER OPTIC CABLE

PRIORITY CLAIM

The present application claims priority from PCT/US2011/064098, filed Dec. 9, 2011, which claims priority from U.S. provisional application 61/425,543, filed Dec. 21, 2010, which is incorporated herein by reference.

TECHNICAL FIELD OF THE INVENTION

The present disclosure relates generally to a system and a method for improving the accuracy of location measurements made using fiber optic cable and backscattered light.

BACKGROUND OF THE INVENTION

The use of backscattered light in fiber optic cables has found increasing acceptance in a variety of applications. Because light can be backscattered from any location along the length of a fiber, information can be obtained over significant distances and such systems are often referred to as "distributed" sensors. Because distortion or deformation of the fiber can be sensed, distributed sensors comprised of fiber optic cable can be used to sense temperature, pressure, strain, acoustic events, and the like. Distributed systems have been used advantageously in oilfield applications, in traffic monitoring, and in military/security applications, among others.

In a typical fiber optic-based distributed sensing system, one or more fiber optic cables designed to collect distributed strain measurements are deployed in a desired location and coupled to the sensing subject by suitable means. One or more light boxes containing laser light sources and signal-receiving means are optically coupled to the fiber. In some embodiments, the light source may be a long coherence length phase-stable laser and is used to transmit direct sequence spread spectrum encoded light down the fiber. The cable may be double-ended, i.e. may be bent in the middle so that both ends of the cable are at the source, or it may be single-ended, with one end at the source and the other end at a point that is remote from the source. The length of the cable can range from a few meters to several kilometers, or even hundreds of kilometers. In any case, measurements can be based solely on backscattered light, if there is a light-receiving means only at the source end of the cable, or a light receiving means can be provided at the second end of the cable, so that the intensity of light at the second end of the fiber optic cable can also be measured.

When it is desired to make measurements, the light source transmits at least one light pulse into the end of the fiber optic cable and a backscattered signal is received at the signal-receiving means. Localized strain or other disruptions cause small changes to the fiber, which in turn produce changes in the backscattered light signal. The returning light signal thus contains both information about the deformation of the fiber and location information indicating where along the fiber it occurred. Known optical time-domain reflectometry (OTDR) methods can be used to infer information about the sensing subject based on the backscattered signal from one or more segments of the fiber adjacent to the subject. Typically, the location of the backscattering reflection at a point along the fiber can be determined using spread spectrum encoding, which uniquely encodes the time of flight along the length of the fiber, dividing the fiber into discrete channels along its length.

In some applications, including downhole applications, the physical channel depths cannot practically be measured directly, but they can be roughly inferred on the basis of timing and fiber refraction index, i.e. the "optical depth." These rough calculations are not sufficiently precise for some purposes, however, because they incorporate uncertainties that, while small on a percent scale, build to a significant magnitude over the length of the fiber. For downhole seismic applications, repeatable physical depth positioning of the channels within an accuracy of 1 meter or better is desired.

Currently, however, there is no practical way to determine the actual physical location of a given backscattered signal. Hence, there remains a need for a system that would allow the physical location of a given backscattered signal to be determined with the desired accuracy and, if possible without requiring re-entry of the well at a later date to measure channel drift.

SUMMARY OF THE INVENTION

The present invention provides a systematic and reliable location measurement that can be repeated over time, optionally using only measurements made only at the lightbox.

The invention includes a method for determining the physical location of a fiber optic channel in a fiber optic cable comprising the steps of a) providing at least one location key having a known physical location, b) establishing the location of the location key with respect to the fiber optic channel, and c) using the location information established in step b) to determine the physical location of the channel. The location key may comprise an acoustic source, a section of fiber optic cable that is acoustically masked, or at least one magnetic field source.

In instances where the location key comprises a magnetic field source, step b) may comprise using a Lorentz force or other electromagnetic effect, such as magnetostrictive force, to establish the location of the magnetic field source with respect to the fiber optic channel. The Lorentz force can be applied by including an electrical conductor deployed near the fiber optic cable and passing a current through the electrical conductor so as to cause it to deform as a result of the magnetic field generated by the magnetic field source. In these instances, an optical signal can be used in conjunction with OTDR in the fiber optic channel to detect the deformation and thereby determine location of the channel. The magnetic field source may or may not be fixed with respect to the fiber optic cable.

In instances where the location key comprises an acoustic source, step b) may comprise using "time-of-day" measurement to correlate a signal transmitted by the acoustic source to a signal received in the fiber optic channel. With this method, when the location key is at a known depth, the acoustic source excites a particular channel and the two can be correlated via independent measurements of the time-of-day noted for the depth measurement and the time-of-day noted for the channel measurement. The location key may or may not move relative to the fiber optic cable. In some cases, the fiber optic cable may be disposed in a well and the location key may comprise an acoustic source that is lowered into the well, recording either when moving into the well, moving out of the well or both.

In instances where the location key comprises a section of fiber optic cable that is acoustically masked, step b) may comprise using ambient noise to establish the location of the acoustically masked section with respect to the fiber optic channel.

In some embodiments, the invention includes masking of intermittent sections of the cable so that the masked sections can be detected using only ambient noise. If the physical positions of the masked segments are known accurately, the calibration between OTDR two-way-light-travel time and cable location can be continuously calibrated simply by observing the masked segments.

Embodiments of the invention may also include interpolation of depth between total depth and surface and reliance on noise made when downhole tools hit casing collar locators as the well is logged.

BRIEF DESCRIPTION OF THE DRAWINGS

For a more complete understanding of the preferred embodiments, reference is made to the accompanying drawing, which is a schematic illustration of a system in accordance with a first embodiment of the invention.

DETAILED DESCRIPTION OF ILLUSTRATIVE EMBODIMENTS

The present disclosure relates generally to a system and a method that allows the physical location of backscattered signals in a fiber optic cable to be determined with precision.

Referring initially to the FIGURE, a well 10 contains a fiber optic cable 12 that follows the well. Cable 12 is optically coupled at one end to a light box 14, such as are known in the art. Cable 12 may be double-ended, i.e. may be bent in the middle so that both ends of the cable are at the light source, or it may be single-ended, with one end at the source and the other end at a point that is remote from the light source. In the embodiment illustrated in the FIGURE, well 10 contains a tubular 11, such as a casing or liner. Cable 12 is run into the well in conjunction with tubular 11 and cement is pumped into the annulus between the tubular and the wellbore, thereby mechanically coupling cable 12 to the formation.

It will be understood by those skilled in the art that there are many suitable techniques by which cable 12 can be coupled to the formation or other subject environment. In the case of well 10, cable 12 can be clamped to tubular 11 or adhered to its inner or outer surface, either in a groove, or not. Cable 12 can be emplaced with the cement or lowered via a wireline. In the latter instance, cable 12 may or may not be subsequently mechanically affixed to the tubular.

Even though, as described above, the cable can be optically interrogated and the resulting optical signal used to divide the fiber into sections or "channels" whose nominal distances from the light box are known, it is not possible to know precisely where each channel is located in relation to the physical environment.

According to the present invention, at least one location key having a known physical location is provided and its location with respect to at least one fiber optic channel is established, thereby allowing the physical location of the channel to be determined.

One way to determine the physical location of each channel is to lower into well 10 an acoustic signaling instrument (not shown) that transmits an intermittent or continuous acoustic signal and serves a location key. If the position of the instrument is tracked as a function of time, the distributed signals from the fiber that are recorded over the same time period can be correlated to the signal position information. Examples of suitable noise-transmitting means include but are not limited to: gauge collars, which generate noise by rubbing against the borehole, wireline sonic tools, cement bond logging tools, and the like. While this technique is described and has particular utility in a borehole, it will be understood that a similar correlation can be performed on any combination of time-stamped physical and optical data, including surface and marine applications.

In a variation of the above technique, an acoustic signal can be generated by movement of the tool, rather than by the tool itself. Thus, for example, a wireline tool that is being lowered in to a borehole will tend to generate an identifiable acoustic signal while rubbing against the side of the hole or when it hits each pipe joint. The tool, whose source location is known, can serve as a location key and the signals it generates can be used to determine the location of each fiber optic channel.

The foregoing method provides information about the location of each channel at a given point in time. So long as the channels do not move, signals received from each channel can be relied on to provide location information. Over extended time periods, however, it may be expected that changes in the optical properties of the fiber may result in movement or change in the actual location of one or more of the channels as-detected. The length of such time periods can depend on the nature of the fiber, the materials from which it is constructed, and the environment in which it is deployed, and can be on the order of 1, 10, 50, or more years. Thus, in instances where it is anticipated that the fiber will be used for a protracted period, one or more sections 16 of cable 12 may be acoustically masked or otherwise decoupled from their environment, as illustrated schematically in the FIGURE. The length of each masked section 16 is preferably relatively short compared to the total length of cable 12 but preferably no smaller than the length of an individual fiber optic channel. By way of example only, masked section(s) 16 may be 1, 10, or 20 meters long. The length of masked segments 16 may be constrained by the resolution of the sensing apparatus.

Because they are acoustically decoupled from their environment, sections 16 will be visible on a DAS system in the presence of ambient noise, even if no other noise-generating operations are occurring. Thus, if the actual positions (depths) of the masked segments are known accurately, each masked section 16 can serve as a location key and the calibration between OTDR time and cable depth can be calibrated by observing the segments in a conventional DAS measurement. Still further, if the actual positions of masked segments do not change as a function of time, the calibration between OTDR time and cable depth can be continuously monitored. If the actual positions of masked segments do change over time, the relationship between OTDR time and cable depth can be re-calibrated.

As with the fiber optic channels, the physical positions of the masked segments can be initially determined and/or subsequently re-determined in several ways. By way of example only, each masked section may contain a weak radioactive source that can be detected in a gamma ray log after fiber installation. That gamma ray (GR) log could then be correlated to formation properties and/or a casing collar locator (CCL) log. Alternatively, the acoustic logging-like locating techniques described above can be used to initially establish the location of the deployed segments. In order to properly observe the masks using DAS OTDR, with maximum resolution, it may be necessary to position the pulse(s) directly over the mask in an iterative procedure.

Cable masking can be provided by including a variable coating on the fiber or by including variations in the cable itself. By way of example only, masked sections 16 can be provided in a gel-filled cable by including sections that have no gel fill. These are preferably created during the cable manufacturing process. In other embodiments the masking can be applied as the cable is deployed, such as by applying a layer of foamed or otherwise acoustically-isolating material. Cable masking other than acoustic is also contemplated, including for example, the inclusion in the cable of a material having varying radial thermal conductivity along the length of the cable.

In still other embodiments, (not shown) one or more localized magnetic field sources are placed in proximity to the fiber and an electrical conductor such as a conducting wire is also placed in proximity to the fiber. In one embodiment, a plurality of localized magnetic field sources is deployed in a spaced-apart manner along the length of a fiber. When a current is passed through the wire, the magnetic field generated by each magnetic field source will cause a force, called the Lorentz force, to be applied locally to the wire. The direction of the force is orthogonal to both the electric current and magnetic field. In the present application, the magnetic field is preferably anisotropic and arranged to be orthogonal to the wire. Thus, the Lorentz force will be orthogonal to the wire, with the result that the wire will be locally curved when current is flowing through the wire. A Lorentz force can be generated using either DC or AC currents, with the effect that vibrations or variable and tunable frequency can be generated.

Because the fiber optic sensors are extremely sensitive, the small deformation of the wire resulting from the application of the Loretz force can be detected using OTDR techniques. Thus, if the physical location of the of the deformation (magnetic field source) is known, each magnetic field source can be used as a location key, i.e. used to calibrate the physical locations of the fiber optic channels. As discussed above, a wireline or similar tool can be used to sense and locate each magnetic field source. In a variation on this embodiment, the magnetic field source(s) can be provided separately from the fiber. In this variation, a conducting wire is preferably included with or near the fiber and one or more magnets is moved along the fiber. The localized magnetic field will cause a localized deflection of the conducting wire, which can in turn be detected using OTDR techniques.

When the exciting current is switched off, the fiber and DAS system performance will be unaffected. When the exciting current is switched on, the fibre and DAS system will only be subjected to vibrations where the magnetic sources are located and not at other locations.

By way of example only, the magnetic field sources may be neodymium magnets and the fiber optic cable may be encapsulated in an optional metal tube that is transparent to magnetic fields. Further by way of example, magnetic field sources can be built into traditional tubing clamps that are used to retain cables during and the fibre cables can be manufactures to include a conductive wire.

Like the other techniques described above, the Loretz-force technique can be used to mark locations on the fibre for depth calibration purposes that will not change with time.

As is known in the art, if the location of each sensor is known, the fiber optic channels can be interrogated in the time scale of fractions of a millisecond, providing a virtually instantaneous measurement at all depths of interest. The information gained in this manner can be used to diagnose and correct a geomechanical model or can be used to directly intervene in the treatment with or without integration with other measurements.

The present methods have no inherent lower limit to the frequency of investigation and are therefore limited only by the stability of the hardware over long time scales. There are various methods of backscatter measurement, including the use of Rayleigh and Brillouin backscattering, and one method may be preferred over others for this implementation of the present invention, especially at low frequency.

Illustrative embodiments of the present claimed subject matter have been described in detail. In the interest of clarity, not all features of an actual implementation are described in this specification. It will be understood that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure. In the claims, unless explicitly stated, the sequential recitation of steps is not intended to require that the steps be performed sequentially.

In still other variations on the foregoing embodiments, optical channels can be located by tracking a tool that generates noise either by rubbing the casing, or sending deliberate pulses or hitting the casing collars. These 'calibration' points provide a physical depths because either the time-stamp is know or the actual depth is measured. Another method for locating channels is by changing something in the cable construction (the mask or the magnate) and transmitting through the cable or casing a signal that does not require the intervention. Another method for locating channels is by creating a pressure pulse in the wellbore that creates a 'wave' down the wellbore with fluid velocity, rock velocity and steel velocity; the wave would show reflected signals at interfaces whose positions were known (e.g. casing shoes, casing collars, cement tops, formation tops etc.).

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope of the claims. By way of example only, one of skill in the art will recognize that the number and location of the location key(s), the manner for determining location key position, the number and configuration of cables and sensors, the sampling rate and frequencies of light used, and the nature of the cable, coupling devices, light sources and photodetectors can all be modified. Accordingly, the protection sought herein is as set forth in the claims below.

What is claimed is:

1. A method for determining the physical location of a fiber optic channel in a fiber optic cable within a well-bore, which comprises the steps of:
   a) providing at least one location key having a known physical location;
   b) establishing the location of the location key with respect to the fiber optic channel; and
   c) using the location information established in step b) to determine the physical location of the channel;
wherein step a) has the location key comprised of the movement of a tool hitting or rubbing against the inside of the well-bore and step b) comprises of the time-depth pairs given by the contractor of the location of the tool with respect to time.

2. The method of claim 1, wherein the fiber optic cable follows the well-bore.

3. The method of claim 1, including a step of interpolating depth between total depth and surface.

4. The method of claim 1, wherein relying on noise made when the tool hits casing collar locators as the well is logged.

5. The method of claim 1, wherein the tool comprises gauge collars.

6. The method of claim 1, wherein the tool is a wireline tool that is being lowered into the well-bore.

7. The method of claim 1, further comprising tracking the tool.

8. The method of claim 1, further comprising tracking the position of the tool as a function of time, while recording distributed signals from the fiber optic cable over the same period, and subsequently correlating the distributed signals to the position information of the tool.

* * * * *